No. 707,023. Patented Aug. 12, 1902.
J. SEITHER.
CREAM SEPARATOR.
(Application filed Feb. 4, 1902.)
(No Model.)
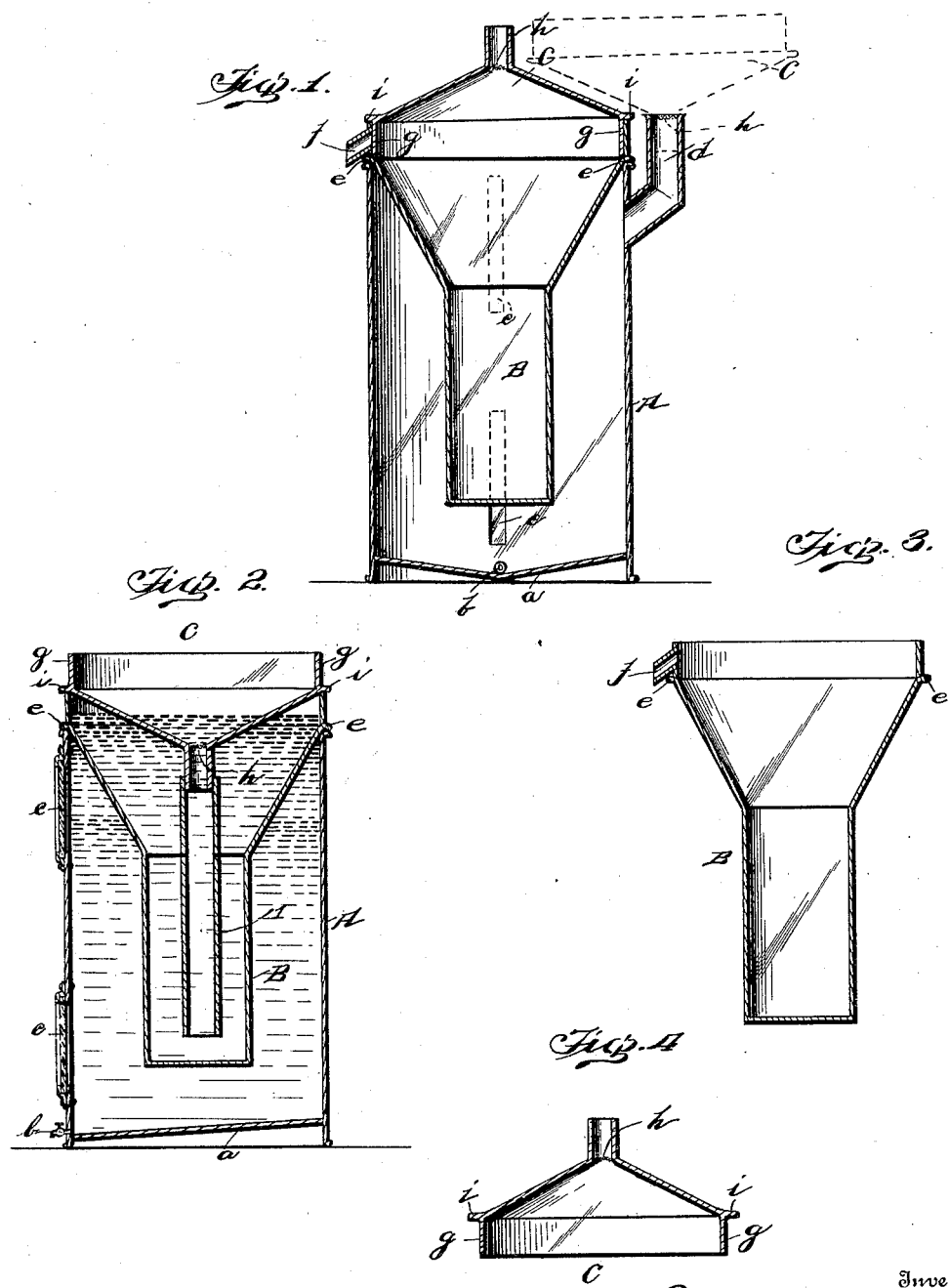

UNITED STATES PATENT OFFICE.

JACOB SEITHER, OF KEOKUK, IOWA.

CREAM-SEPARATOR.

SPECIFICATION forming part of Letters Patent No. 707,023, dated August 12, 1902.

Application filed February 4, 1902. Serial No. 92,576. (No model.)

*To all whom it may concern:*

Be it known that I, JACOB SEITHER, a citizen of the United States, residing at Keokuk, in the county of Lee and State of Iowa, have invented a new and useful Improvement in Cream-Separators, of which the following is a specification.

My invention relates to an improvement in cream-separators, the primary object, of course, being to accomplish what the name implies—namely, the effectual separation of milk and cream—and to accomplish this with the least expenditure of labor without mixing the water used to cause the separation with the milk and to do all of this with absolute cleanliness.

With the foregoing objects in view my invention consists in two separate detachable compartments, one of which is adapted to rest in the other, one for the milk and the other for the water used in the process of separation; and it still further consists in means for changing the water without tipping the separator or disturbing its contents.

My invention still further consists in certain novel features of construction and combinations of parts, which will be hereinafter described, and pointed out in the claims.

In the accompanying drawings, Figure 1 is a vertical section through the entire apparatus. Fig. 2 is a similar view taken at right angles thereto. Fig. 3 is a detached view of the water can or compartment, and Fig. 4 is a detached view of the cover.

A is the milk-can, which may be and preferably is cylindrical in form, open at the top and provided with an inclining bottom $a$, at the lower end of which a faucet $b$ is located for drawing off the milk. On the exterior the gages $c$ $c$ are located, through which to observe the condition of the contents. At one side a filling-tube $d$ is provided, through which the milk is poured into milk-can A.

B indicates the water-can. (Shown detached in Fig. 3.) This is funnel-shaped, open at the top and closed at the bottom, and provided with circumferential flange $e$, adapted to fit and rest upon the upper edge of can A when in place, whereby to close the latter, thus excluding all dust, dirt, or extraneous matter from the milk by forming a tight seat at the top. The water-can is provided with a spout $f$, through which contents flow out.

C represents the cover. This also is funnel-shaped and serves four functions. The first is as a cover, its flange $g$ fitting the open end of the water-can while the cream is separating, so as to keep the water as cool as possible. A second function is its use as a funnel, through which to pour milk into the filling-tube $d$ on the side of can A, and to this end it has a strainer $h$ to strain the milk as it passes through. The third function is to supply fresh water to the water-can. When used in this capacity, it is inverted, as when used for filling the milk-can; but in this instance instead of having its spout in the filling-tube $d$ it is placed in the water-can with its flange $i$ resting upon the open end of the water-can. Its spout is long enough, or it may be lengthened for that purpose, to reach nearly to the bottom of said water-can. To fill the water-can with fresh water, the cold water is poured into this cover, and the extension-tube $l$ on the end of the cover, as indicated in Fig. 2, carries the cold water to the bottom of the water-can. This forces the warm water out through overflow-spout $f$. In this connection it may be stated that while water is preferred it is obvious that ice could be used in the water-can B in lieu thereof. The fourth function of the cover is to cover the milk-can when the water-can is removed.

From the foregoing it will be apparent that the separator is operated with the utmost convenience and the milk-can does not have to be disturbed, and the water can be removed as often as desired without the slightest agitation to the milk. At the same time a large cooling-surface comes in contact with the milk, causing speedy and perfect separation. Of course a continuous flow of water could in this way be provided for, and as the water and milk are not mixed together it is not necessary to be as particular with the water as would otherwise be necessary.

To clean the separator, the three parts constituting the entire apparatus—namely, the milk-can, the water-can, and the cover—may be taken apart and thoroughly washed, as they involve no complicated parts.

It is evident that slight changes might be made in the form and arrangement of the several parts described without departing from the spirit and scope of my invention, and hence I do not wish to limit myself to the exact construction herein set forth; but, Having fully described my invention, what I claim as new, and desire to secure by Letters Patent, is—

1. The combination with a milk-can and a water-can, one adapted to fit into the other, the milk-can having a filling-tube and the water-can an outlet-spout, of a funnel-shaped cover having a spout adapted to enter the filling-tube whereby to facilitate the operation of pouring milk into the milk-can, and said spout adapted to reach to or nearly to the bottom of the water-can when used in the operation of filling the latter.

2. The combination with a milk-can, and a funnel-shaped water-can closed at the lower end and open at the upper end, said upper end of a size to fit the milk-can and constitute a cover therefor, and this upper end provided with a water-overflow spout, of a funnel-shaped cover capable of inversion to serve as a filling device as well as a cover, the spout of the funnel-shaped cover having an extension of sufficient length to discharge its contents at or near the bottom of the water-can.

3. The combination with a milk-can provided with a filling-tube, and a funnel-shaped water-can closed at its lower end and constructed at its upper end to fit the upper end of the milk-can whereby to close it, said water-can provided with an overflow-spout, of a cover of funnel shape and of a size to cover the water-can when placed thereon in either its normal or inverted position, and the spout of the cover of a size to fit the filling-tube of the milk-can whereby when joined thereto it may be utilized in the operation of filling the milk-can with milk, and said spout adapted to reach to or nearly to the bottom of the water-can when placed therein whereby to discharge water at that point.

In testimony whereof I have signed this specification in the presence of two subscribing witnesses.

JACOB SEITHER.

Witnesses:
 RICE H. BELL,
 JOHN A. SMITH.